United States Patent [19]
Howarth

[11] Patent Number: 4,582,328
[45] Date of Patent: Apr. 15, 1986

[54] DOUBLE ACTING STIRLING ENGINE PISTON RING

[75] Inventor: Roy B. Howarth, Clifton Park, N.Y.

[73] Assignee: Mechanical Technology Incorporated, Latham, N.Y.

[21] Appl. No.: 565,859

[22] Filed: Dec. 27, 1983

Related U.S. Application Data

[63] Continuation-in-part of Ser. No. 354,020, Mar. 2, 1982, Pat. No. 4,422,649.

[51] Int. Cl.$^4$ .............................. F16J 15/40; F16J 9/00
[52] U.S. Cl. ........................................ 277/75; 277/216
[58] Field of Search ................. 277/75, 216, 74, 27, 277/214

[56] References Cited

U.S. PATENT DOCUMENTS

| | | | |
|---|---|---|---|
| 3,589,738 | 6/1971 | Tracy | 277/75 |
| 3,751,047 | 8/1973 | McGee | 277/216 |
| 4,299,401 | 11/1981 | McCormick | 277/216 |
| 4,422,649 | 12/1983 | Houarth | 277/75 |

Primary Examiner—Robert L. Smith
Attorney, Agent, or Firm—Joseph V. Claeys; Charles W. Helzer

[57] ABSTRACT

A piston ring design for a Stirling engine wherein the contact pressure between the piston and the cylinder is maintained at a uniform level, independent of engine conditions through a balancing of the pressure exerted upon the ring's surface and thereby allowing the contact pressure on the ring to be predetermined through the use of a preloaded expander ring.

4 Claims, 5 Drawing Figures

HIGH PRESSURE

LOW PRESSURE

DOUBLE ACTING STIRLING ENGINE PISTON RING

The Government of the United States of America has rights in this invention pursuant to Contract No. DEN3-32 awarded by U.S. Department of Energy.

This application is a continuation in part of Ser. No. 354,020 filed Mar. 2, 1982 now U.S. Pat. No. 4,422,649.

FIELD OF THE INVENTION

The present invention relates to an improved piston ring especially advantageous for use in a double acting Stirling engine.

BACKGROUND OF THE INVENTION

Present Stirling engine designs have highly pressurized gas, such as hydrogen, utilized as the working gas. The basic principle of Stirling engine operation is the utilization of a piston disposed between a high pressure and low pressure region which results in the movement of the piston which provides a work output. In an unlubricated Stirling engine, a non-metallic material is typically used for the piston ring or rings to maintain a seal between the two pressure regions. Since such material normally has a low modulus of elasticity, in order to maintain contact between the right and the cylinder wall for sealing purposes, a radial force must be applied to the ring. This has usually been achieved by connecting the inner surface of the piston ring with the high pressure gas in the engine cycles. Some designs provide additional loading by various forms of internal expanders. However, with such arrangements, the contact pressure between the ring and the cylinder will vary during each engine cycle and with engine operating conditions. This varying contact pressure leads to inefficient sealing of the piston in the cylinder. While it is important to maintain contact for sealing purposes, it is also important to limit and control the contact pressure to reduce the friction and wear of the rings.

SUMMARY OF THE INVENTION

It is an object of the invention to provide a piston ring having a contact pressure with the cylinder which is independent of transient operation of a double acting Stirling engine.

The present invention provides for a piston ring wherein contact pressure is maintained at a uniform level, independent of the gas pressure in the engine, or the cycle changes. This is accomplished by providing an elastomeric seal which isolates the inner surface of the piston ring from the alternating high pressure gas and maintains contact between the piston ring and the low pressure side of a piston ring groove. Radial holes are provided in the mid-plane of the piston ring and communicate the mean pressure in the leakage path between the piston ring and the cylinder, to the inner surface of the piston ring. By such an arrangement, the pressure forces acting on the inner and outer surfaces of the piston ring are balanced. The contact pressure between the ring and the cylinder is now maintained by an expander ring which provides the required preload.

In a further embodiment by providing two mirror-imaged rings on the piston the cyclic pressure changes of a double acting Stirling engine can be effectively sealed.

This invention advantageously allows for control of the preload and contact pressure and provides more flexibility in the ring construction and manufacture. Also, it is possible to improve the piston ring seal efficiency by increasing the length of the leakage path between the ring and the cylinder without increasing friction and wear.

BRIEF DESCRIPTION OF THE DRAWINGS

These and other objects and advantages will be realized by the present invention, the discussion of which should be taken in conjunction with the drawings wherein.

DETAILED DESCRIPTION OF THE PREFERRED EMBODIMENT

Figure 1:
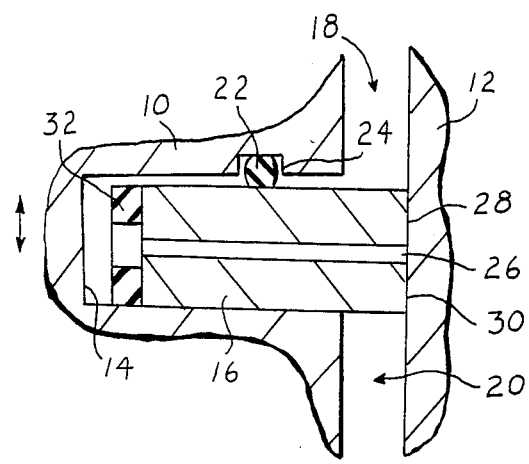
FIG. 1 is a partial sectional side view of a piston ring mounted on a piston.

With reference to FIG. 1, there is depicted a side sectional view of a reciprocating cylindrical piston 10 disposed in a cylinder 12 of a Stirling engine. The piston 10 has an annular notch 14 disposed about its outer surface which serves as a receptacle for a piston ring 16, shown disposed therein and in contact with the cylinder 12. The ring 16 provides for sealing the piston 10 in the cylinder during its reciprocal movement therein. The ring 16 is positioned between a high pressure region in the cylinder and a low pressure region, generally indicated 18 and 20 respectively, and a working gas, typically hydrogen, is located in these regions.

An elastomeric seal 22 is provided and maintained in a notch 24, formed perpendicular to annular notch 14 on the high pressure side of the ring 16. This seal 22 serves to isolate the inner surface of the piston ring 16, and bias the low pressure side of the ring 16 into contact with the adjacent side of annular notch 14.

Throughout the circumference of the ring 16 is a plurality of radial openings 26 which pass through its mid-plane and communicate the mean pressure in the leakage path between sealing surfaces 28 and 30 with the inner surface of the piston ring 16. This provides for a balancing of the pressure forces acting on the inner surface and the outer surface of the piston ring 16. Contact between the ring 16 and the cylinder 12 is now maintained by an expander ring 32 positioned behind the ring 16 biasing the ring 16 into contact with the cylinder 12. This expander ring 32 may take the form of a spring or any other type suitable for purpose.

Accordingly, the sealing provided by ring 16 is determined by the loading provided by the expander ring 32 which is predetermined and remains constant, independent of changes in the engine conditions.

Figure 2:
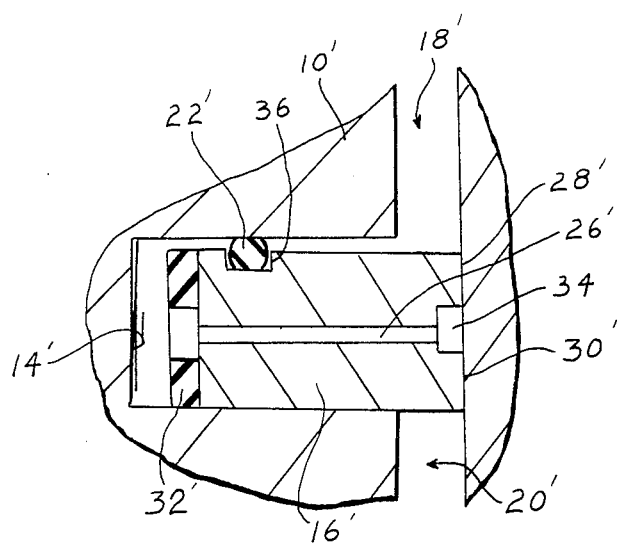
FIG. 2 is a partial sectional side view of a modified piston ring mounted on a piston similar to that of FIG. 1.

Turning now to FIG. 2, another embodiment of the invention is shown with parts similar to those in FIG. 1 similarly numbered and designated with a prime ('). In this embodiment, the average pressure between the peripheral sealing surfaces 28' and 30' communicates with a circumferential groove 34 in the piston ring 16'.

Radial openings 26 communicate the average pressure to the inner surface of the piston ring 16'. Note that as an alternate to that shown in FIG. 1, seal 22' may be maintained in a notch 36 formed in the piston ring 16' rather than on the piston 10 as shown in FIG. 1.

Figure 3:
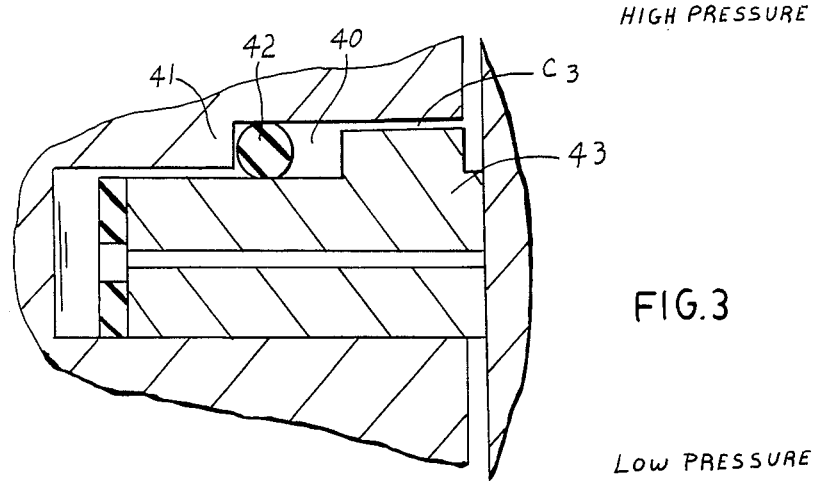
FIG. 3 is a partial sectional side view of another embodiment of the invention and illustrates a piston ring mounted on a piston.

FIG. 3 shows a further embodiment of the invention. The piston ring utilizes the same pressure balancing technique and has the same basic features of the embodiments previously described and shown in FIGS. 1 and 2. The significant difference is that the elastomeric seal, 42, is housed in cylindrical space, 40, of rectangular cross section formed between the notch in the piston and the piston ring itself. This structure allows easier manufacture and fabrication. Under normal operations the elastomeric seal, 42, abuts the stepped surface, 41, of the notch in the piston. The cylindrical extension, 43, of the piston ring insures that the elastomeric seal cannot be radially displaced under transient conditions but has no effect on the normal operation of the piston ring. The small clearance, $C_3$, limits any movement, distortion or twisting of the ring cross section which might occur during reciprocating motion.

In a double acting engine where there are out-of-phase cyclic pressures above and below the pistons it is common practice to use two piston rings per piston. To prevent axial movements of the piston rings in their grooves, the space between the rings is maintained at a pressure which is less than or equal to the cycle pressures. An example would be where the pressure between the rings is the minimum cycle pressure.

Figure 4:
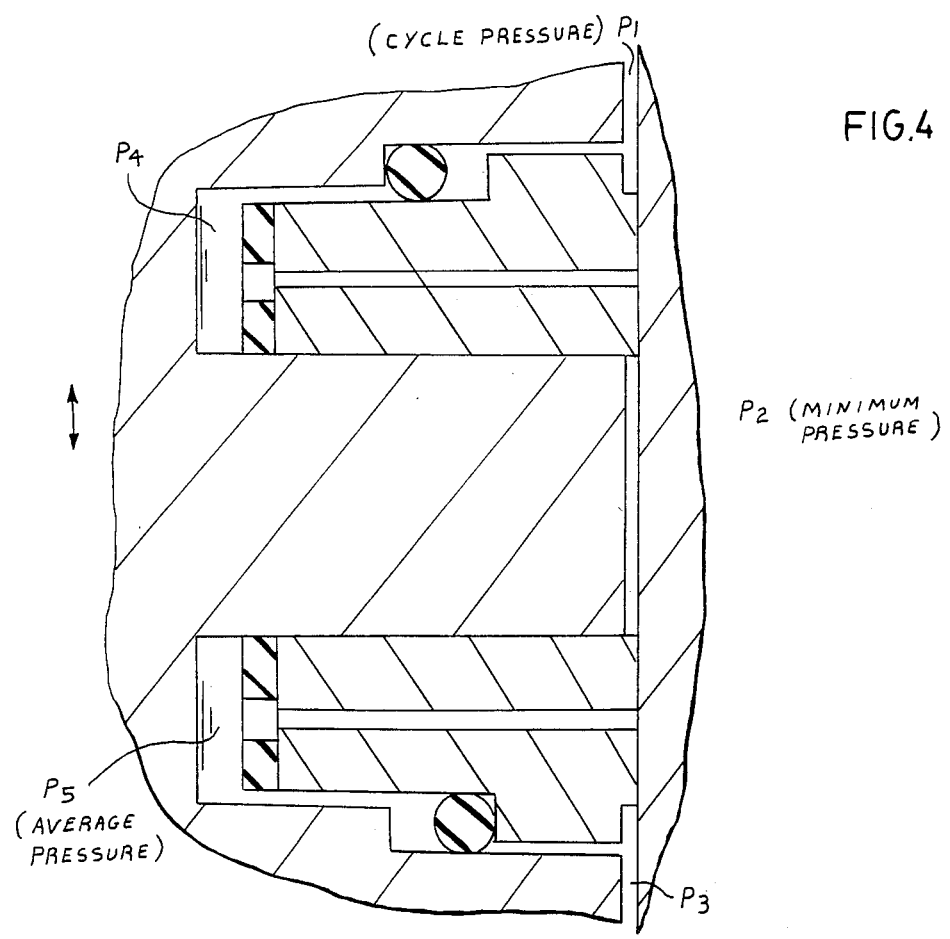
FIG. 4 is a partial sectional side view of another embodiment of the invention illustrating two piston rings mounted on a double acting piston.

FIG. 4 shows a system which employs two pressure balanced piston rings of the type previously described and shown in FIG. 3, to manage the out-of-phase cyclic pressures of a double-acting engine. (Two rings of the type shown in FIGS. 1 and 2 could also be used.) Note that $P_1$ and $P_3$ are the alternating cycle pressures and $P_2$ is the minimum pressure between the rings. $P_4$ and $P_5$ are the average pressures of $P_2$ and the leaking cycle pressure, either $P_1$ or $P_3$.

Figure 5:
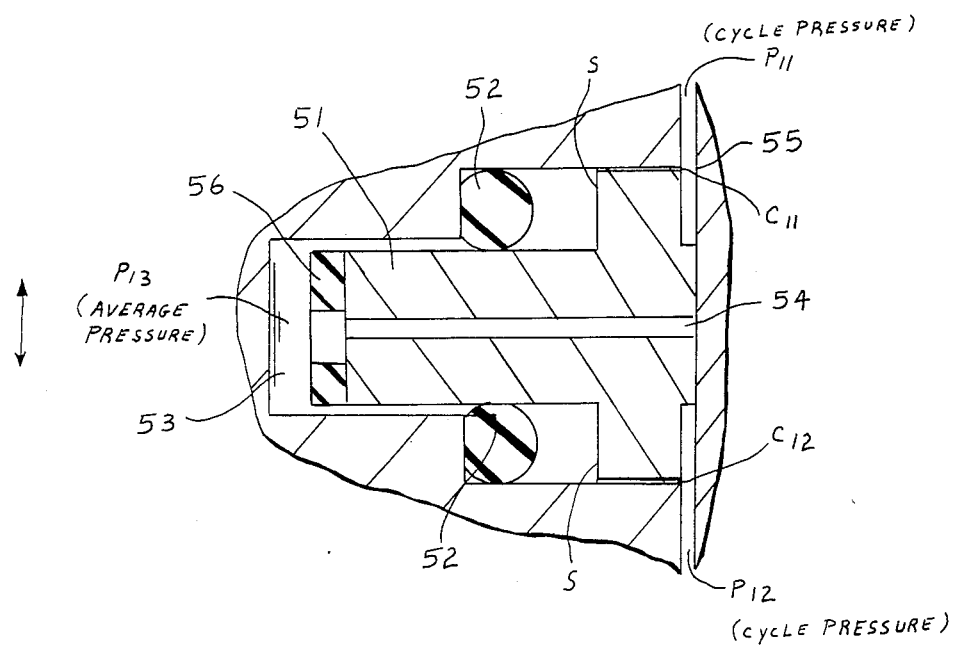
FIG. 5 is a partial sectional side view of still another embodiment of the invention illustrating a single piston ring mounted on a double acting piston.

FIG. 5 relates to a further embodiment of the basic pressure balanced ring concept in which a single piston ring maintains a seal regardless of the pressure difference across it. The embodiment of FIG. 5 is specifically capable of providing the same sealing function in a double acting engine as the two ring per piston system shown in FIG. 4.

The basic features of the invention are shown in FIG. 5. The piston ring, 51, is made from a plastic, elastomer or other material with low elastic modulus. Two O-rings or similar seals, 52, isolate the inner clearance space, 53, from the cyclic pressures $P_{11}$ and $P_{12}$. Radial holes, 54, communicate the gas pressure in the leak path between the piston ring and the cylinder wall, 55, to the inner clearance space to provide pressure balancing at an average pressure $P_{13}$. An expander ring, 56, exerts a radial force on the piston ring to maintain contact with the cylinder wall. The maximum thickness of the piston ring and the corresponding groove dimension are chosen to provide small but finite clearances, $C_{11}$ and $C_{12}$. This limits the axial movement of the ring relative to the groove and any twisting or distortion of the ring cross section under the combined effects of the reciprocating motion and the cyclic pressures. Under normal operating conditions there is a clearance between the surfaces, S, of the piston ring and the O-rings, 52, but under transient conditions these surfaces prevent the O-rings from being completely dislodged.

What is claimed is:

1. A pressure balanced piston ring for limiting the leakage of a high pressure region on one side of the piston ring to a region of low pressure on the opposite side of the piston ring along a cylinder wall, said piston ring apparatus comprising:
    a piston ring of low elastic modulus material maintained in a circumferential groove in said reciprocating piston;
    two elastomeric seals, positioned on opposite axial sides of said piston ring so as to isolate an inner surface from the high and low pressure regions;
    means for balancing the pressure on said inner surface of the piston ring with the average pressure in a leak path between the piston ring and the cylinder wall, thereby rendering friction and wear of the piston ring independent of the high and low pressures; and
    means for exerting a predetermined force on said piston ring to maintain contact with the cylinder wall and control the friction between the piston ring and the cylinder wall and leakage between the high and low pressure regions.

2. A pressure balanced piston sealing ring assembly for use in providing a seal between a piston and a cylinder in which is contained one variable pressure region on one side of the sealing ring assembly and an oppositely variable pressure region on the other side of the sealing ring assembly, comprising:
    a piston sealing ring;
    an inner and outer surface on said piston sealing ring;
    a contact surface on said outer surface slidingly engageable with said cylinder;
    a first sidewall on said sealing ring exposed to one variable pressure region;
    a first elastomeric seal operatively associated with said first sidewall for isolating said inner surface from said one variable pressure region;
    a second sidewall on said sealing ring exposed to the oppositely variable pressure region;
    a second elastomeric seal operatively associated with said second sidewall for isolating said inner surface from said oppositely variable pressure region;
    a leakage path between said oppositely variable pressure regions coupled to radial passageways through said sealing ring for communicating an average pressure to the inner surface of the piston sealing ring so as to balance pressure forces acting on the inner and outer surfaces; and
    means for exerting a predetermined force on said sealing ring to maintain said contact surface in engagement with the cylinder so as to provide a seal therebetween.

3. The piston ring assembly of claim 2, further comprising a circumferential groove and two associated steps on said piston, said groove being of an appropriate depth to contain said exerting means and said piston sealing ring and said two steps being of a lesser depth, one elastomeric seal disposed in each step such that each elastomeric seal is maintained in sealing contact between said piston sealing ring and said piston so as to isolate said inner surface.

4. The piston ring assembly of claim 3, further comprising a cylindrical extension on each sidewall exposed to the variable pressure regions such that said sealing ring forms a T-shaped cross section so as to contain said elastomeric seals.

* * * * *